United States Patent
Hassan et al.

(10) Patent No.: US 12,036,774 B2
(45) Date of Patent: Jul. 16, 2024

(54) ELASTOMERIC CHEMICAL BARRIER ARTICLES

(71) Applicant: Ansell Limited, Richmond (AU)

(72) Inventors: Noorman Abu Hassan, Selangor (MY); Darryl Nazareth, Iselin, NJ (US); Putri Faridatul Akmar Binti Megat Abdul Aziz, Selangor (MY); Muhammad Ishkandar Abdul Hamid, Cyberjaya (MY); Fazli Bin Shani, Selangor (MY); Khadzrul Ariff Mohamad Baki, Selangor (MY)

(73) Assignee: Ansell Limited, Victoria (AU)

( * ) Notice: Subject to any disclaimer, the term of this patent is extended or adjusted under 35 U.S.C. 154(b) by 0 days.

(21) Appl. No.: 17/603,169

(22) PCT Filed: Apr. 28, 2020

(86) PCT No.: PCT/AU2020/050404
§ 371 (c)(1),
(2) Date: Oct. 12, 2021

(87) PCT Pub. No.: WO2020/223756
PCT Pub. Date: Nov. 12, 2020

(65) Prior Publication Data
US 2022/0194061 A1 Jun. 23, 2022

Related U.S. Application Data (60) Provisional application No. 62/844,374, filed on May 7, 2019.

(51) Int. Cl.
*B32B 25/18* (2006.01)
*B32B 7/12* (2006.01)
(Continued)

(52) U.S. Cl.
CPC .............. *B32B 25/18* (2013.01); *B32B 7/12* (2013.01); *B32B 25/08* (2013.01); *B32B 27/34* (2013.01);
(Continued)

(58) Field of Classification Search
CPC ........... B32B 25/18; B32B 7/12; B32B 25/08; B32B 27/34; B32B 37/1207;
(Continued)

(56) References Cited

U.S. PATENT DOCUMENTS 6,075,081 A * 6/2000 Nile .......................... C08J 5/02
524/840
2002/0104606 A1 8/2002 Ohzuru et al.
(Continued)

FOREIGN PATENT DOCUMENTS

KR 100929207 B1 * 12/2009
WO WO 2015-093780 A1 6/2015
(Continued)

OTHER PUBLICATIONS

IUPAC. "Oxo compounds," Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook. (Year: 2019).*
(Continued)

*Primary Examiner* — John D Freeman
(74) *Attorney, Agent, or Firm* — Moser Taboada (57) ABSTRACT

Provided among other things is an elastomeric article providing a chemical barrier, the article having a layered structure comprising a sequential laminate of: (a) a latex-based elastomeric polymeric barrier layer; (b) a non-reactive tie adhesive resin layer comprising oxo (—(C=O)—) groups; and (c) a polyamide layer; wherein the layered
(Continued)

structure has a first side nearest the latex-based elastomeric polymeric barrier layer and a second side; wherein the layered structure is effective to provide a chemical permeation time in excess of 100 minutes pursuant to EN 16523-1:2015 for benchmark solvents of acetone, ethyl acetate and methanol, when applied to the first side, and in excess of 100 minutes for acetone when applied to the second side; and wherein the elastomeric layer is primarily not polyolefin.

21 Claims, 3 Drawing Sheets (51) Int. Cl.
  B32B 25/08 (2006.01)
  B32B 27/34 (2006.01)
  B32B 37/12 (2006.01)
  C08J 5/02 (2006.01)
(52) U.S. Cl.
  CPC .............. *B32B 37/1207* (2013.01); *C08J 5/02* (2013.01); *B32B 2037/1215* (2013.01); *B32B 2250/02* (2013.01); *B32B 2250/24* (2013.01); *B32B 2307/51* (2013.01); *B32B 2307/714* (2013.01); *B32B 2307/7265* (2013.01); *B32B 2437/02* (2013.01); *C08J 2315/02* (2013.01); *C08J 2323/00* (2013.01); *C08J 2333/24* (2013.01)
(58) Field of Classification Search
  CPC ........ B32B 2037/1215; B32B 2250/02; B32B 2250/24; B32B 2307/51; B32B 2307/714; B32B 2307/7265; B32B 2437/02; B32B 5/026; B32B 27/08; B32B 2250/03; B32B 2250/04; C08J 5/02; C08J 2315/02; C08J 2323/00; C08J 2333/24; A41D 19/015; A62B 17/00
  See application file for complete search history.

(56) References Cited

U.S. PATENT DOCUMENTS

| 2005/0037683 | A1* | 2/2005 | Konishi ............... A41D 31/185 442/394 |
| 2005/0255771 | A1 | 11/2005 | Chetty et al. |
| 2007/0134486 | A1 | 6/2007 | Bansal et al. |
| 2009/0077713 | A1 | 3/2009 | Saunders et al. |
| 2009/0188019 | A1* | 7/2009 | Hassan ................... B29C 41/14 2/164 |
| 2010/0130085 | A1 | 5/2010 | Yu |

FOREIGN PATENT DOCUMENTS

| WO | WO 2017-041134 A1 | 3/2017 |
| WO | WO 2018-136653 A1 | 7/2018 |

OTHER PUBLICATIONS

International Search Report, PCT application No. PCT/AU2020/050404, dated Jul. 31, 2020.
Database WPI, Week 201010, Thomson Scientific, London, GB; an 2009-S18369, XP002809217, 3 pgs.

* cited by examiner

FIG. 1

*DENOTES REACTIVE SITES

ELASTOMERIC CHEMICAL BARRIER ARTICLES

The present application relates generally to elastomeric chemical barrier articles containing a laminate of elastomer, non-reactive tie adhesive resin comprising oxo and polyamide.

To allow a user to handle various tools and objects in a chemical environment, a piece of protective clothing such as glove is provided. The glove provides some flexibility and dexterity during its use in addition to providing a high level of protection against dangerous chemical solvents and esters. Generally, prior art barrier materials ensure protection to only very limited number of chemicals and when a user must handle tasks of several other different chemical families, a common solution is overgloving gloves that are resistant to each of these families to form a complimentary protection. An overglove, or overgloving, may be used, for example, as an additional layer of protection, which is disposed on another glove. However, this solution of overgloving is not ergonomically practical in that it hinders handling and makes the composite glove too bulky.

An available solution to this issue is a plastic typed welded glove, but this type of glove does not possess the good fit, comfort feel, dexterity and flexibility of an elastomeric glove (e.g., nitrile, neoprene or butyl glove). While Nitrile and Neoprene have good protection against non-polar solvents, they have very limited chemical protection against polar solvents. Butyl or butyl/viton materials have a slightly more comprehensive range of chemical protection than Nitrile and Neoprene, but still have weaknesses. Therefore, an elastomeric feel glove that has a broader range of chemical protection coverage than Nitrile, Neoprene, Butyl or Butyl/Viton gloves has become a sought after product. Provided here is a glove with dexterity and flexibility, but superior performance measured in permeation time against a broader range of polar solvents. Generally, performance against non-polar solvents is maintained.

SUMMARY

An elastomeric article providing a chemical barrier, the article having a layered structure, in accordance with embodiments of the present invention, substantially as shown in and/or described in connection with at least one of the figures, as set forth more completely in the claims, are disclosed. Various advantages, aspects, and novel features of the present disclosure, as well as details of an exemplary embodiment thereof, will be more fully understood from the following description and drawings. Also shown and described are methods of making and using the elastomeric article providing a chemical barrier.

The foregoing summary is not intended, and should not be contemplated, to describe each embodiment or every implementation described in the disclosure. Other and further embodiments of the present invention are described below.

DESCRIPTION OF THE DRAWINGS

So that the manner in which the above recited features of embodiments of the present invention can be understood in detail, a more particular description of that briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

The elastomeric article can be bootie, bootie extending to the calf or to most of the inseam, wader, body suit covering most of the body (for example not including a facial area), glove, including a glove extending over most of the wrist or past the elbow, and the like.

Figure 1:
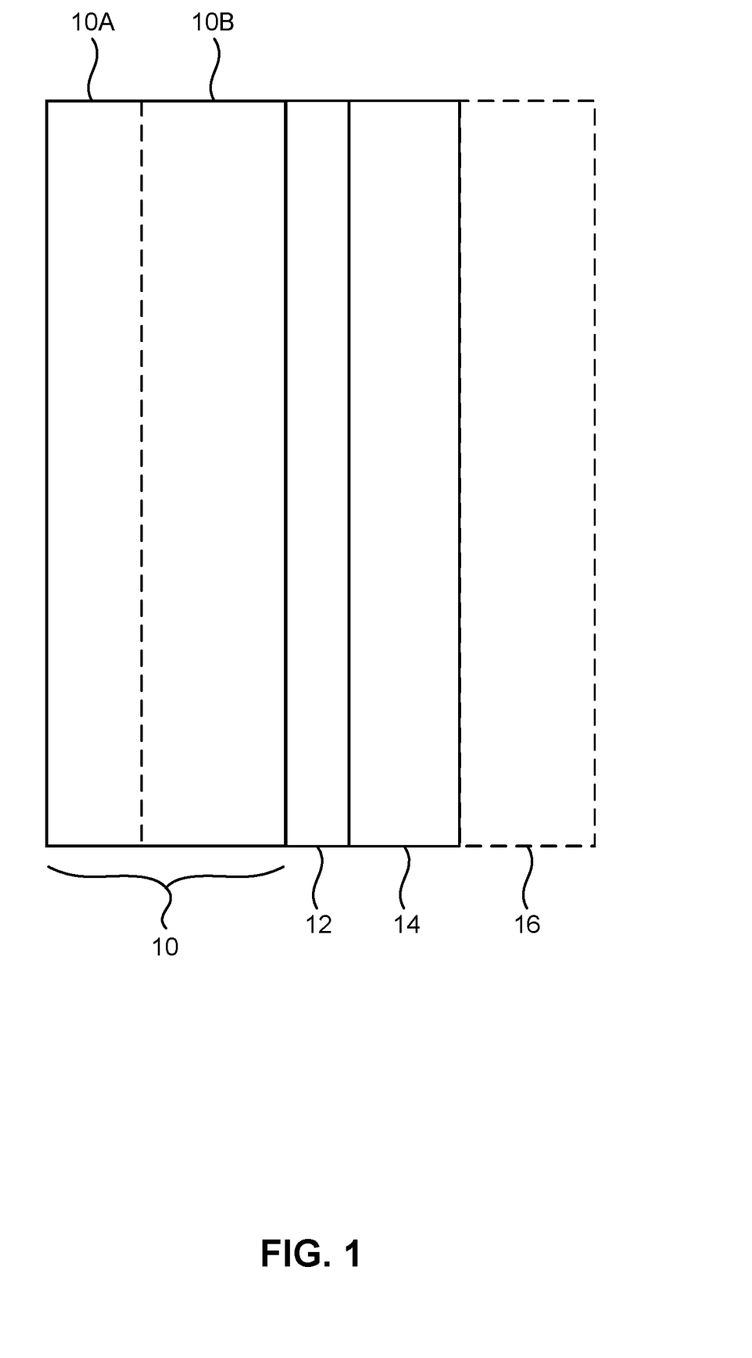
FIG. 1 shows a multi-layer structure including the laminate of elastomer (elastomeric polymeric barrier layer), non-reactive tie adhesive resin comprising oxo and polyamide.

Exemplary layered structures are shown in FIG. 1. Layer 10 is an elastomeric polymeric barrier layer, which can be latex-based. In embodiments, this "layer" is comprised of several sublayers (such as by multiple dipping or other coating processes) such as sublayers 10A and 10B. All references herein to layer 10 includes a reference to sublayer 10B. The sublayers may or may not be analytically distinguishable. The sublayers can be of different composition. Layer 12 is of a non-reactive adhesive resin comprising oxo (—C=O—) groups. Layer 14 is a polyamide layer. Layer 16 can be multiple sublayers of materials or one sublayer, or be absent. For example, Layer 16 can comprise an adhesive and a flock adhered thereto. Or, Layer 16 for example can comprise a hot melt adhesive and a bonded fabric, such as a fabric liner for a glove.

In embodiments, layer 10 is from about 5 mils to about 20 mils. In embodiments, layer 12 is from about 0.3 mil to about 6 mils, such as from about 0.5 mils to about 3 mils. In embodiments, layer 14 is from about 0.1 mils to about 5 mils, such as from about 1.0 to about 2.0 mils. Typically, the Layer 10 provides more than 50% of the thickness of the glove, and the polymer thereof is thereby the primary polymer.

Elastomeric Polymeric Barrier Layer

The elastomeric polymeric barrier layer can comprise a layer or sublayer of natural and synthetic lattices such as natural rubber (NR), chloroprene rubber (CR), butyl rubber (IIR), acrylonitrile butadiene rubber (NBR or nitrile, which can be carboxylated, isoprene rubber (IR), styrene-butadiene rubber (SBR, e.g. carboxylated), polyurethane, Butyl and Viton combinations, mixtures thereof, and blends of the foregoing with elastomeric latex, thermoplastic saturated water dispersible polyester resin, ultrafine high molecular weight polyamide powder, ethylene based copolymers such as ethylene-propylene diene (EPDM) latex or styrene ethylene butylene styrene block copolymers (SEBS copolymers), hydrophobic type natural wax such as carnauba wax, and mixtures thereof. (In this context, "ultrafine" means average particle size of 20 microns or less by laser scanning. In this context, "high molecular weight" means a melting point from about 115° C. to about 180° C.)

The elastomeric polymeric barrier layer from natural and synthetic lattices is chosen for its barrier properties to chemicals, as well as its user-friendly properties such as flexibility and elasticity. The elastomeric polymeric barrier layer polymer can be for example chosen from polar synthetic elastomer such as polychloroprene (neoprene) or carboxylated acrylonitrile butadiene (nitrile) or non polar synthetic elastomer such carboxylated Styrene butadiene, butyl, Isoprene or otherwise blends of the foregoing.

In embodiments, the elastomeric polymeric barrier layer or sublayer adjacent to the non-reactive tie adhesive resin comprises predominantly (more than 50% wt. among polymeric components) NBR.

In embodiments, the elastomeric polymeric barrier layer or sublayer adjacent to the non-reactive tie adhesive resin comprises predominantly (more than 50% wt. among polymeric components) CR. In embodiments, such a predominantly CR sublayer is adjacent to another elastomeric polymeric barrier sublayer with a distinct polymer composition.

Blends of lattices with non-polar elastomeric latex, such as SBR (e.g., carboxylated) or PI can enhance swelling degradation resistance and permeation time with respect to polar solvents. Such a blend can be useful the blend is homogenous colloidally stable and compatible, and the blend does not create two-phase separation and voids between two polymer interfaces. In embodiments, a lattice of predominantly NBR, CR or a mixture thereof is blended with SBR, PI, butyl or a mixture thereof.

Hydrophobic additives such as hydrophobic wax (such as carnauba wax and polyolefin waxes) in the elastomeric polymeric barrier layer or sublayer can enhance outside surface hydrophobicity and assist in shielding or wicking off the contacting solvents from the outside layer, thus reduces further the potential of solvent swelling or permeation.

In embodiments, the elastomeric polymeric barrier layer or sublayer comprises a thermoplastic polyester. By "thermoplastic," it is meant that the polymer, in another context, can be used to form hot melt compositions. The amounts by weight of elastomer to polyester can be for example from about 19:1 by wt to about 4:6, or from about 9:1 to about 7:3, or about 5% to about 30% by wt. Such blends enhance resistance to solvent swelling and/or permeation.

Figure 2:
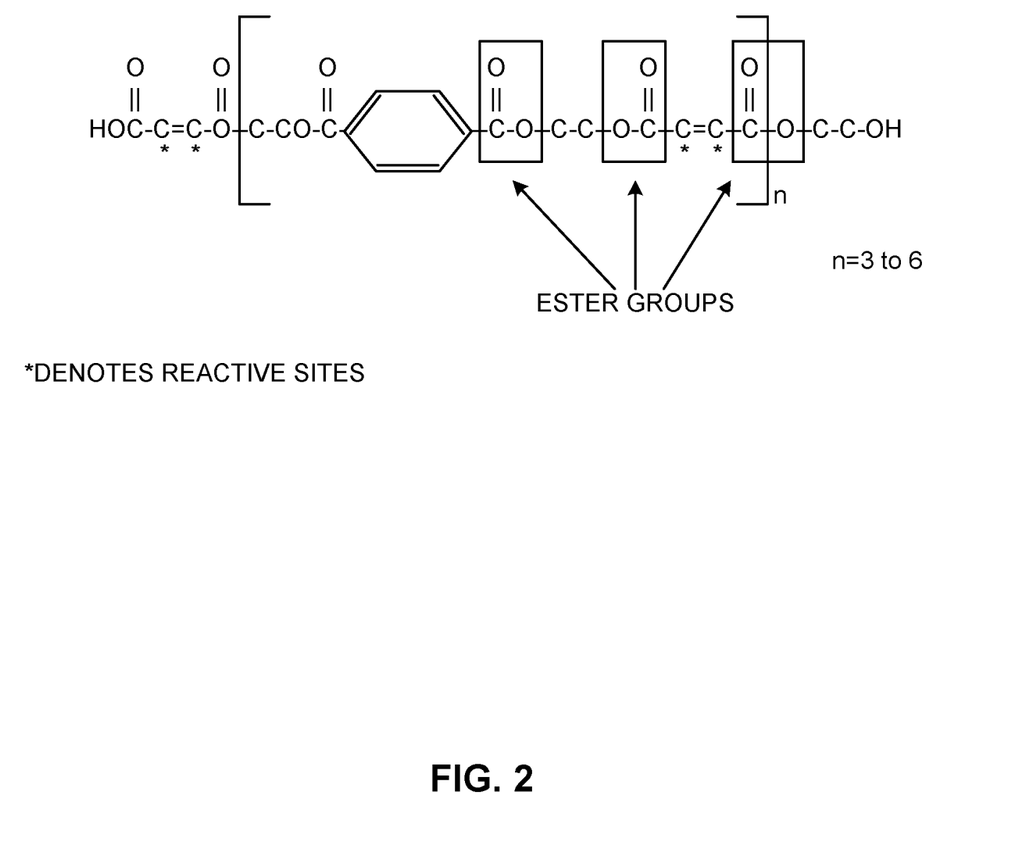
FIG. 2 shows a polyester structure.

FIG. 2 shows an idealized version of such a polyester. Note the positions of the ester groups (CO—O—C) and the reactive sites (C*═C*) within the molecular chain.

In embodiments, the MW of the polyester is from about 14,000 to about 26,000.

The polyester is usefully hydrophobic, meaning that it resists water, resulting in minimal water being absorbed by it. The polyester usefully also dries quickly and shows a "wicking effect." Thus, by introducing a hydrophobic polyester, which can be saturated, in the elastomeric polymeric barrier layer on the outside of the glove article, solvents in contact with that layer can be wick away and reduce the potential of solvents swelling and degradation. Moreover, a number of lattices such as nitrile or neoprene lack of resistance to polar solvents such as acetone or toluene, and these polymers are shielded by the presence of hydrophobic polyester in the first layer of elastomer/polyester blends. (By "saturated" it is meant that any remaining unsaturation is low and not enough to provide effective crosslinking.)

In other variants, the elastomeric polymeric barrier layer can also be blended with water dispersible non-polar thermoplastics such as saturated water dispersible polyester resin, for example having a softening point above 50° C. Such Thermoplastic elastomer compositions exhibit exceptional resistance to solvent swelling. The polyester is advantageously a linear polyester such as terephthalate, isophthalate or copolyester thereof, e.g. polyethylene terephthalate (PET) and polytetramethylene terephthalate (PBT).

In embodiments, the elastomeric polymeric barrier layer 10 can be blended with for example 5-20% ultrafine high performance polyamide powder such as Orgasol PA12, and/or 1-5% acid anhydride modified polyolefin, and/or 1-5% fatty acid amide soap, and/or mixtures thereof. The polymer composition, such as a blended mixture, can also be enhanced with water soluble carbodiimide compounds such as Zoldine XL-29SE crosslinker and/or high acid ionomer of ethylene and methacrylic acid copolymer resins such as Surlyn and Nucrel. Such acid anhydride-modified polyolefin polymer can be combined with a polyamide powder polymer and/or fatty acid amide soap to form a non-ionomeric composition and linked to the carboxylated nitrile polymer by the dhydration reactions mediated by the carbodiimide compounds. The acid anhydride-modified polyolefin polymers include, for example ethylene-based copolymers, particularly ethylene-propylene (EP) ethylene-butene (EB); ethylene-hexene (EH); ethylene-octene; styrene-ethylene/butylene-styrene (SEBS), ethylene-propylene diene (EPDM), ethylene-vinyl acetate (EVA) and various ethylene-alkyl acrylate copolymers such as, for example, ethylene-methyl acrylate (EMA); ethylene-ethyl acrylate (EEA) and various ethylene-propyl acrylate (EPA); ethylene-butyl acrylate (EBA) copolymers; and the like. Other polyolefin-based copolymers also can be used such as polypropylene and polybutene-based copolymers. These copolymers include random, block, and graft copolymers which have been functionalized with acid anhydride groups. Examples of commercially available acid anhydride polyolefin that can be used in embodiments of the invention include, but not limited to, Amplify GR functional polymers, Fusabond polymers, Polybond and Royaltuft.

In embodiments, the polymer of the elastomeric polymeric barrier layer further comprises vinyl polymers comprising oxo (—(C═O)—) groups.

In embodiments the polymer of the elastomeric polymeric barrier layer is primarily not polyolefin (i.e., <50% wt of polymers). In embodiments the polymer of the elastomeric polymeric barrier layer is substantially not polyolefin (<30%). In embodiments the polymer of the elastomeric polymeric barrier layer is materially not polyolefin (<20%). In embodiments the polymer of the elastomeric polymeric barrier layer is essentially not polyolefin (<5%).

Non-Reactive Tie Adhesive

Without being limited to theory, the non-reactive tie adhesive resin comprising oxo (—(C═O)—) groups are believed to form a strong hydrogen and polar bonds to the polyamide layer. The result of this is believed to be markedly enhanced resistance to permeation and swelling by polar solvents. One measure of this is enhanced resistance to acetone permeation, regardless of the face of the face of the laminate to which the acetone is applied. Other measures of enhanced resistance to permeation or swelling by polar solvents are described herein. These measures show that the tie adhesive resin is effective, irrespective of whether Applicant's theory is correct.

The non-reactive tie adhesive resin can be used as a water-based dispersion. Exemplary resins include ethylene vinyl acetate (EVA), ethylene methyl acrylate (EMA), acid modified olefin copolymers such as ethylene acrylic acid (EAA) or ethylene grafted maleic anhydride (AMP), ethylene vinyl polyester, ethylene vinyl chloride and or blends of two or more of the forgoing.

The non-reactive tie adhesive polymer resins can be for example EVA emulsion containing a small amount of Polyvinyl alcohol as protective colloids. The resin can be chosen for its elastomeric softness, chemical resistance, flexibility and its effectiveness as binder adhesive to both synthetic latex and polyamide surfaces. Either carboxylated acrylonitrile-butadiene or polychloroprene or its blends is tied up with a layer of strong hydrogen bonding to the polyamides such as polycaprolactam (Nylon 6), polyhexamethyleneadipamide (Nylon 6,6) and poly hexamethylenesebecamide (Nylon 6,10). Other equally effective non reactive tie adhesive resin materials include for example ethylene-methylene acrylate (EMA), ethylene-acrylic acid (EAA) and Ethylene-grafted maleic anhydride (AMP), and mixtures of the various resins comprising oxo. The side groups of some illustrative useful resins are illustrated as follows:

Ethylene-vinyl acetate (EVA)

Ethylene-methyl acrylate (EMA)

Ethylene-acrylic acid (EAA)

Ethylene-grafted-maleic anhydride (AMP)

The resins comprising oxo can contain minor monomer components not part of the polymer naming, such as acrylic acid, acrylates, alpha olefin, vinyl alcohol, and silanes.

Minor portions of polymers with compatibilizing effect with polyamide polymer and/or a strong barrier of hydrogen bonds against various polar solvents and esters can be added. Examples include Polyvinyl Alcohol, Polyacrylic acid, Polyacrylamide, Polyethylene, Polystyrene, and mixtures thereof. In embodiments, such polymers are present during the polymerization of the adhesive resin comprising oxo groups and can act either as colloidal stabilizer, adhesion promoter or crosslinker in a water-based emulsion polymerization process.

Polyamide Layer

The polyamide layer can be formed of any number of polyamide materials, including described below or those built from the building blocks described below. It is believed that binary, tertiary or further blends of polyamides can enhance solvent resistance.

The polyamide or polyamides can be chosen from either nylon terpolymer solution prepared from a selected monomer groups of epsilon caprolactam or 2-oxohexamethyleneimine, polymethylene diamine and polymethylene diacides including prepared by condensing a monocarboxylic acid, diamine and dimerized fatty acid, condensing an acid component of dimerized fatty acids, at least one aliphatic unbranched monocarboxylic acid and at least one aliphatic branched monocarboxylic acid with ethylene diamine and hexamethylene diamine as the amine component. A particular useful class of polyamides includes those in which (a) about 98-100 mole percent of the imine groups are derived from hexamethylene diamine, (b) about 15-55%, and preferably about 25-55, mole percent of the carbonyl groups are derived from dimerized fatty acid of 36 carbon atoms, (c) about 10-45, and preferably about 5-45, mole percent of the carbonyl groups are derived from polymethylene diacid of 10-20 carbon atoms. Usefully, these polyamides can have a minimum flow temperature of about 100 to about 200° C. Suitable polymethylene diamines for preparing suitable polyamides include hexamethylene diamine, heptamethylene diamine, octamethylene diamine, nonamethylene diamine, decamethylene diamine, undecamethylene diamine, dodecamethylene diamine, tridecamethylene diamine, and octadecamethylene diamines. Suitable polymethylene diacids for preparing suitable polyamides include adipic acid, pimelic acid, suberic acid, azelaic acid, sebacic acid, dodecanedioic, brassilic, tetradecandioic, octadecanedioic, and 1,10-decanedicarboxylic acid. Suitable aminoacids include 6-aminocaproic, 7-aminoheptanoic, 8-aminocaprylic, 9-aminononanoic, 10-aminodecanoic, 11-aminoundecanoic, 17-aminoheptadecanoic, and the like. The polyamide can be blends of polyamide and copolyamides block copolymers and graft copolymer solution. Useful polymers derived from the polyamides preparation includes nylons selected from a mixture consisting of one, two or three of nylon 6, nylon 66, nylon 69, nylon 610 and nylon 612.

The polyamide resin layer for example can be chosen from resins with lower melting ranges starting preferably from 100 to 200 degrees Celsius. Commercially available nylons having a softening point above 100° C. can be advantageously used in the practice of embodiments of this invention. Examples of suitable polyamides are polylactams (Nylon 6), polypropiolactam (Nylon 3), polyenantholactam (Nylon 7), polycaprylactam (Nylon 8), polylaurylactam (Nylon 12), and the like:homopolymers of aminoacid such as polyaminoundecanoic acid (Nylon 11); polypyrrolidinone (Nylon 4); copolyamides of dicarboxylic acid and diamine such as Nylon 6,6, polytetramethyleneadipamide (Nylon 4,2), polyhexamethylenesebacamide (Nylon 6.10), polyhexamethyleneisophhthlamide (Nylon 6.1), polyhexamethylenedodecanoic acid (Nylon 6.12) and the like; aromatic and partially aromatic polyamides; copolyamides such as of caprolactam and hexamethyleneadipamide (Nylon 6/6.6) or a terpolyamide e.g. Nylon 6/6.6/6.10; block copolymers such polyether polyamide; or mixtures thereof. A terpolymer mix of a certain composition ratio can be particularly useful.

A useful range of Nylon Terpolymer composition mix is Nylon 6/66/69 at 35-55%/5-35%/20-55%. Another useful range of Nylon Terpolymer composition mix at Nylon 6/66/610 at 30-75%/10-80%/10-80%. Alternatively, another useful range of Nylon Terpolymer composition mix is Nylon 6/66/612 at 30-75%/10-80%/10-80%. [All ranges or amounts from about to about.]

The polyamide layer preferably comprises primarily (by weight) polyamides among polymer components.

In applying the polyamide layer to the non-reactive tie adhesive resin the polyamide can be dispersed in water, or in solvent such as ethanol, methanol, 2-propanol, 1-propanol, 1-butanol, benzyl alcohol, furfuryl alcohol, formic acid, phenol, m-cresol and the like, and/or mixtures of these or mixtures thereof with water.

Exemplary nylons include:

Nylon 69 (6.9)   [NH—(CH$_2$)$_6$—NH—CO—(CH$_2$)$_7$—CO]$_n$
Nylon 610 (6.10) [NH—(CH$_2$)$_6$—NH—CO—(CH$_2$)$_8$—CO]$_n$
Nylon 612 (6.12) [NH—(CH$_2$)$_6$—NH—CO—(CH$_2$)$_{10}$—CO]$_n$

Features of the Laminate of Layers 10, 12 and 14

As compared to the barrier properties of any prior art, as has been demonstrated in experimentally, the materials of embodiments of the invention make it possible to increase the time taken for the solvents to pass through an article of the laminate, and to constitute a barrier across a broad expanded range of chemicals. That range never having been achieved in the past with primary elastomeric polymers such as nitrile, neoprene or butyl. Moreover, this material have good elasticity, less bulky and less plastic feel as compared to other prior arts using welded HDPE plastic and/or HDPE bonded as a inner lining to a butyl glove. Such HDPE gloves have a wide range of chemical resistance, but have a plastic feel and are baggy in the palm area. Thus, these gloves provide the user with less dexterity and comfort.

Donning Layer; Other Internal Layers

Subsequent layers (Layer 16), such as a donning layer can use any polymeric adhesive for donning materials such as acrylates, polyurethane, any other synthetic lattices and/or off line thermal hot melts adhesive bonding of knitted liners made from fabric such as fabrics of cotton, nylon, HPPE, Kevlar, like materials, and combinations.

Exemplary Process of Making

Figure 3:
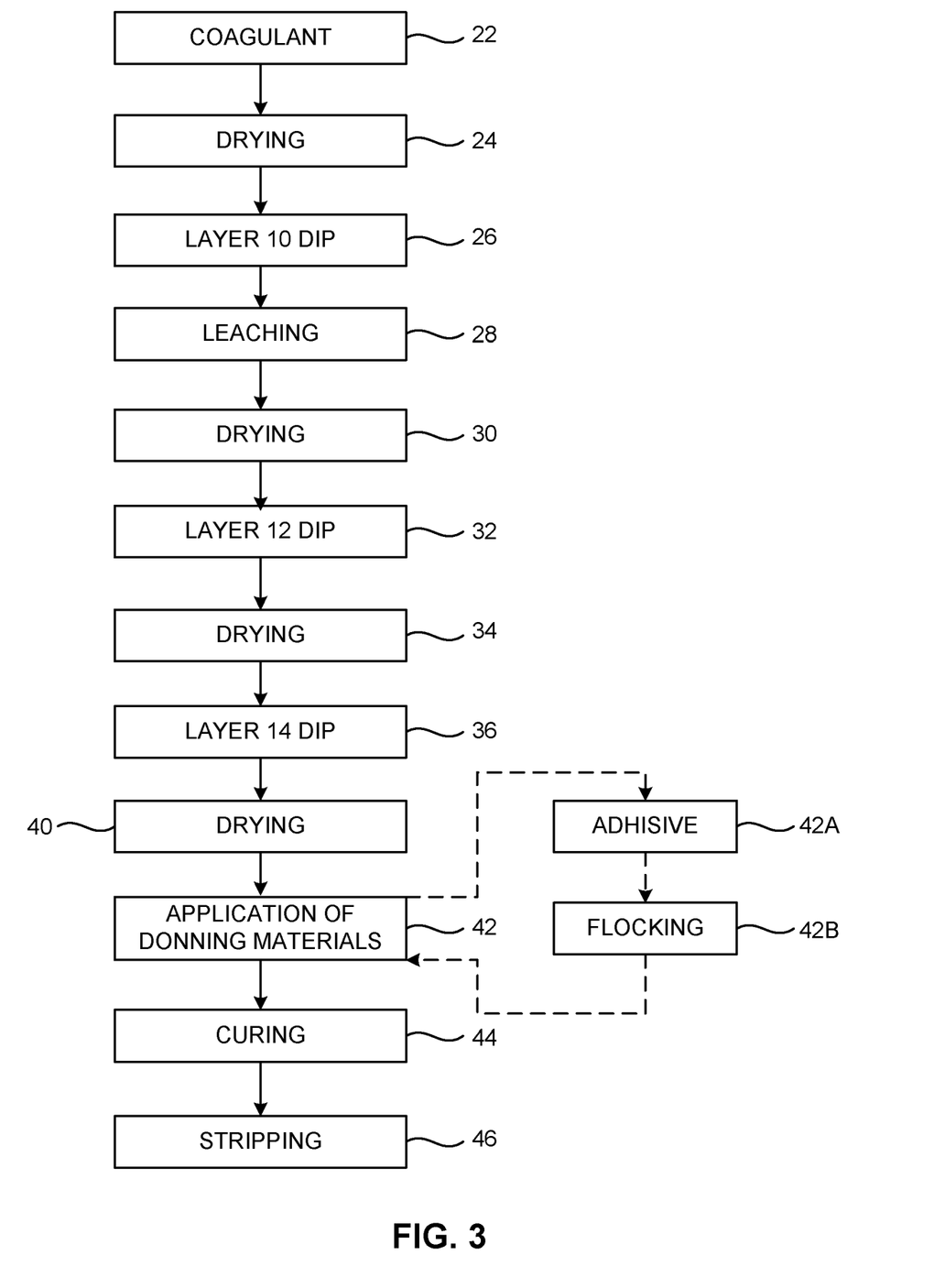
FIG. 3 shows exemplary steps for making structures of the invention.

In FIG. 3, process 20 can begin with step 22, applying a coagulant to a mandrel. Where the dipping step does not need a coagulant, the step can be omitted.

In step 24, coagulant (if applied) is dried. In step 26, the material of Layer 10 is applied by dipping. If multiple layers are applied, these can be by dipping, typically followed by drying. After dipping, the mandrel can be turned over or otherwise manipulated to control drip. In step 28, the applied polymer can be leached (optional). The mandrel can be turned over or otherwise manipulated to control drip. In step 30, the applied material can be dried. In embodiments, the layer 10 material is cured prior to proceeding with further steps, and a cure step can be omitted later. For example, curing may substitute for step 30, or follow step 30 (prior to step 32).

In step 32, the layer 12 adhesive is applied, typically by dipping. The mandrel can be turned over or otherwise manipulated to control drip, and then dried in step 34. In step 36, the layer 14 material can be applied, typically by dipping. The mandrel can be turned over or otherwise manipulated to control drip. In step 40, the applied material can be dried. In embodiments, step 36, or steps 36 and 40, are repeated.

In optional step 42, donning materials, such as polyacrylates, or polyurethanes are applied. In an embodiment, Adhesive is applied (step 42A) and then flock is applied (step 42B).

In embodiments, a hot melt adhesive is applied to allow the stripped article to be adhered to a fabric liner. For example, a stripped glove with layer 14 on the outside (after reinversion from stripping) is mounted on a collapsible mandrel, a hot melt thermoplastic glue is then applied before a liner is fabricated onto the glued glove followed for example by air inflation and hot melt oven drying.

In step 44, if the polymers used need curing, they are cured. The article can be stripped from the mandrel (step 46). After drying or curing steps, the mandrel can be cooled.

In embodiments, a hot melt adhesive is applied to allow the stripped article to be adhered to a fabric liner. For example, a stripped glove with layer 14 on the outside (after reinversion from stripping) is mounted on a collapsible mandrel, a hot melt thermoplastic glue is then applied before a liner is fabricated onto the glued glove followed by air inflation and hot melt oven drying.

Another variant is by applying Layer 12 before curing and dipping into Layer 14 after curing. In such variant, there curing may substitute for step 34, or follow step 34. Other process steps can remain unchanged.

Layer 14 Testing

Suitable nylon materials for layer 14 can be confirmed by testing on cast sheets. Nylon terpolymer solution is cast on a glass plate to produce for example an about 2.4 mil dry film after oven drying for 45 minutes at 90° C. The cast Nylon film sheet is free from any pinholes. The smooth and flexible cast film is tested as per EN 16523-1:2015 Chemical permeation testing. The testing is against Acetone, Acetonitrile, Dichloromethane, Ethyl acetate, Tetrahydrofuran and Toluene. Cured Carboxylated Acrylonitrile-butadiene or Nitrile (NBR) film typically has poor breakthrough times against these chemicals. Below are exemplary valued obtained (along with measured median thicknesses of the samples):

| Breakthrough time (minutes) | Sample 1 | Sample 2 | Sample 3 |
|---|---|---|---|
| Acetone | > 480 (median thickness: 0.066 mm) | > 480 (median thickness: 0.065 mm) | > 480 (median thickness: 0.063 mm) |
| $CH_3$—CN | > 480 (median thickness: 0.065 mm) | > 480 (median thickness: 0.062 mm) | > 480 (median thickness: 0.062 mm) |
| $CH_2Cl_2$ | 30 (median thickness: 0.061 mm) | 20 (median thickness: 0.067 mm) | 30 (median thickness: 0.073 mm) |
| Ethyl acetate | > 480 (median thickness: 0.072 mm) | > 480 (median thickness: 0.064 mm) | > 480 (median thickness: 0.066 mm) |
| THF | > 480 (median thickness: 0.067 mm) | > 480 (median thickness: 0.074 mm) | > 480 (median thickness: 0.068 mm) |
| Toluene | > 480 (median thickness: 0.066 mm) | > 480 (median thickness: 0.070 mm) | > 480 (median thickness: 0.069 mm) |

As can be seen, breakthrough times for all by methylene chloride are outstanding. The times, except for methylene chloride (methylene chloride) times, promise performance better than or comparable to other chemical protective gloves.

Permeation Resistances

In embodiments, the chemical barriers of embodiments of the invention provides certain minimal permeation times as measured by EN 16523-1:2015. Six new chemicals have been added to the list of hazardous compounds under the condition of continuous contact from original specified 12 chemicals in EN 374-3. One pictogram and three types of gloves are specified; Type A with breakthrough time > or =30 min for at least 6 chemicals; Type B with breakthrough time > or =30 min for at least 3 chemicals; Type C with breakthrough time > or =10 min for at least 1 chemical in the new list. The test method is applicable to the assessment of protection against liquid chemicals that can be collected only by liquid or gaseous collecting media, is not adapted for the assessment of chemical mixtures, except for aqueous solutions, is used for gloves with the following information defined: a preconditioning of sample for at least 16 h at a temperature of 23 +/−2 deg C and assembled permeation cell placed in a temperature controlled room at similar temperature. For multilayer protective clothing or glove material, in case of unbonded layers (in this case not applicable to embodiments where liner is thermally hot melt bonded), the internal layers without any effect on the chemical protection can be removed (e.g. thermal insulation layers). The final measurement is the average of three individual specimen per glove for a total of 3 gloves of each lot of chemical barriers. In embodiments, permeation times for one or more of tetrahydrofuran, acetone, acetonitrile, ethyl acetate, toluene, methylethylketone, methyisobutylketone, diethylamine, methanol or ethanol are 30 minutes or more, or 50 minutes or more, or 100 minutes or more, or 200 minutes or more, or 300 minutes or more, or 400 minutes or more, or 480 minutes or more. In embodiments, permeation times for sulfuric acid are 30 minutes or more, or 50 minutes or more, or 100 minutes or more.

Coating thicknesses, uniformity or evenness, moisture or air traps (voids), dryness between each layer, dryness of leached glove before and after tie-layer are important process variables For acetone, in embodiments one or more of the above values pertain if applied to the layer 14 side (second side) or the layer 10 side (first side). For one or more of the remaining chemicals recited in the paragraph above, in embodiments one or more of the above values pertain if applied to the layer 10 side (first side).

Degradation Resistance

In embodiments, the chemical barriers of the invention provides certain maximal degradation percentages (swelling) as measured by EN 374-4:2013. The principle of this testing is to measure if there is a change in the force required to puncture the glove material after continuous contact of its external surface with a challenge chemical for 1 hour continuous exposure to the challenge chemical. This puncture test is very similar to the procedure detailed in the performance standard to assess protection from mechanical risks detailed in EN 388:2016. The force required to push a standard stylus through a sample of the glove material is compared before and after exposure to the challenge chemical for 1 hour continuous period. The final measurement is the average of three individual measurements for a given lot of chemical barriers. In embodiments, for one or more of toluene, ethylacetate (EtAc), acetone, MeOH or sulfuric acid, the value can be about 30% or less. In embodiments, for one or more of EtAc, acetone, MeOH or sulfuric acid, the value can be about 20% or less. In embodiments, for one or more of EtAc or sulfuric acid, the value can be about 15% or less.

Flexibility/Stiffness

In embodiments of the invention, the polymeric layers of articles of the invention have stiffness of 130, or 125, or 123.4 mgf or less, as measured by a Gurley stiffness Tester (Model 4171T, Gurley Precision Instruments, Troy, NY). In comparison, the invented glove is comparable to a typical bonded Butyl glove (MAPA Butoflex 650, MAPA Professional) apart from bonded Neoprene (Nitopren 717, Honeywell Safety, Basingstoke, UK), the invented glove is more flexible (less stiff) than bonded Neoprene (Scorpio 08-354, Ansell, Iselin, NJ), bonded Nitrile (Flexiproof, Ansell) and bonded PVC (Multiplus, Ansell). Values as an average of four sets of data were:

| Glove | Av. Gurly Unit/mgf |
|---|---|
| Inventive Glove | 123.36 |
| Honeywell NitoPren 717 | 67.76 |
| MAPA Butoflex 650 | 113.29 |
| Scorpio 08-354 | 182.09 |
| Flexiproof | 226.57 |
| Multiplus | 410.68 |

Misc

Specific embodiments according to methods of the present invention will now be described in the following examples. The examples are illustrative only, and are not intended to limit the remainder of the disclosure in any way.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention.

A laminate is a bonding, fusing, adhesion, or the like between polymer layers, or between polymer and fabric layers, such that in the range of anticipated use the laminate is a unitary structure.

Where a sentence states that its subject is found in embodiments, or in certain embodiments, or in the like, it is applicable to any embodiment in which the subject matter can be logically applied.

EN ISO 374-1: 2016 incorporates EN 374-2: 2014 (Penetration test), EN16523-1:2015 (Permeation test) and EN374-4:2013 (Degradation test).

tained between 8.7 to 9.5 throughout the dipping process. The wet gel latex was then leached in hot water for 5 minutes and cured in an oven in three stages. The cured glove was stripped as per normal process. The gloves made in this manner were used as the control nitrile gloves.

For the nitrile/nylon gloves, the above dipping procedure was repeated until after the leaching process, at which point the nitrile gelled latex was dipped into a 10% Nylon solution. The dipped glove was then cured in three stages as per above and stripped off from the former.

For the nitrile/EVA/nylon gloves, the above dipping procedure was repeated until after the leaching process, at which point the nitrile gelled latex was dipped into the 25% EVA copolymer solution. After dripping off excess EVA from former (facing downward), the EVA coated material was oven dried, then dipped into a 10% Nylon solution. The dipped glove was then cured in three stages as per above and stripped off from the former.

All three glove variants; Control, Nitrile/Nylon and Nitrile/EVA/Nylon are tested for acetone breakthrough according to EN 16523-1:2015. Testing was for direct contact with the Nitrile surface or the Nylon surface for both Nitrile/Nylon (without EVA tie layer) and Nitrile/EVA/Nylon (with EVA tile layer). The results of testing is tabulated below:

| Breakthrough time (minutes) against Acetone | Sample 1 | Sample 2 | Sample 3 |
|---|---|---|---|
| Control (NBR only) | 10 (median thickness: 0.277 mm) | 5 (median thickness: 0.278 mm) | 10 (median thickness: 0.260 mm) |
| NBR/Nylon (Nylon surface exposed) | ≥ 480 (median thickness: 0.309 mm) | ≥ 480 (median thickness: 0.291 mm) | ≥ 480 (median thickness: 0.303 mm) |
| NBR/Nylon (NBR surface exposed) | 10 (median thickness: 0.279 mm) | 15 (median thickness: 0.288 mm) | 10 (median thickness: 0.281 mm) |
| NBR/EVA/Nylon (Nylon surface exposed) | ≥ 480 (median thickness: 0.311 mm) | ≥ 480 (median thickness: 0.319 mm) | ≥ 480 (median thickness: 0.297 mm) |
| NBR/EVA/Nylon (NBR surface exposed) | ≥ 480 (median thickness: 0.294 mm) | ≥ 480 (median thickness: 0.300 mm) | ≥ 480 (median thickness: 0.296 mm) |

EXAMPLE 1

Comparing Nitrile, Nitrile/Nylon and Nitrile/EVA/Nylon

A nitrile glove was made consistent with the following:

|  | Dry (parts) |
|---|---|
| Carboxylated Nitrile Latex | 100 |
| Ammonia or potassium hydroxide | 0.3-0.8 |
| Sodium Lauryl Sulfate | 0.5-1.0 |
| Curing Agents | 4.0-7.0 |
| Pigments | 1.9 |

A 25% EVA copolymer solution and 10% Nylon solution were prepared for dipping.

A heated former or mandrel was dipped into a 45% Calcium Nitrate heated coagulant solution followed by dipping into the 38% Total solids content latex compound formulated as above. The latex compound pH was main- Thus, the EVA layer has proven to be an effective tie adhesive resin layer between the nylon and nitrile coating. Unexpectedly, the gloves resist acetone breakthrough even when applied to the NBR surface. Without the EVA layer, the NBR side behaves much like the NBR-only glove.

EXAMPLE 2

Neoprene Glove

The above Example is now repeated using polychloroprene compound instead of Nitrile latex compound. The Neoprene compounded formulation was as per formulation below:

|  | Dry (parts) |
|---|---|
| Polychloroprene Latex | 100 |
| Potassium Caseinate | 0.05-0.3 |

-continued

| | Dry (parts) |
|---|---|
| Potassium Oleate | 0.5-1.0 |
| Ethylene oxide condensate surfactant | 0.1-0.4 |
| Curing Agents | 7.0-12.0 |
| Pigments | 2.3 |
| Thickener | 0.1-0.2 |

All other dipping parameters and processing was per example 1 except that the glove was cured in an oven in three stages with a modified temperature profile.

The results of typical Chemical Permeation testing according to EN 16523-1:2015 were carried out on the CR/EVA/Nylon glove against scores of chemicals and benchmarked against other typical barrier gloves of nitrile, nitrile/neoprene laminated glove, butyl, butyl/viton and HPPE welded gloves is as tabulated below:

| | | Chemical Permeation Breakthrough Time, minutes | | | | | |
|---|---|---|---|---|---|---|---|
| Chemical | Group | Example 2 CR/EVA/ Nylon | CR (Ansell 29-865) | Nitrile (Ansell Sol-Vex 37-145) | CR/NBR Laminate | Butyl (Ansell ChemTek 38-514) | Butyl Viton (Ansell ChemTek 38-612) | HPPE (Ansell Barrier 02-100) |
| THF | ether | >480 | <10 | <10 | 5-15 | 5 | <10 | >480 |
| Acetone | ketone | >480 | <10 | <10 | 5-15 | 428 | 144 | >480 |
| Acetonitrile | nitrile | >480 | 10-30 | <10 | 15-20 | >480 | >480 | >480 |
| Dichloro-methane | chlorinated hydrocarbon | 10 | <10 | <10 | NA | <5 | 48 | 16 |
| Ethyl Acetate | esther | >480 | 10-30 | 10-30 | 10-30 | 43 | 25 | >480 |
| Toluene | aromatic hydrocarbon | >480 | <10 | 10-30 | 10-20 | <25 | 10 | >480 |
| MEK | ketone | >480 | <10 | <10 | NA | 76 | 10-30 | >480 |
| MIBK | ketone | >480 | 10-30 | <10 | NA | 69 | 10-30 | >480 |
| Diethyl-amine | amine | >480 | <10 | 10-30 | NA | <5 | 10-30 | >480 |
| Methanol | alcohol | >480 | 60-120 | 30-60 | NA | >480 | >480 | >480 |
| Ethanol | alcohol | >480 | 240-480 | 240-480 | NA | 240-480 | >480 | >480 |
| Sulfuric Acid 96% | acid | 142 | 240-480 | 30-60 | NA | 2 | >480 | >480 |

The CR/EVA/Nylon glove outperforms all the benchmarked gloves except for having comparable performance to the HPPE welded glove Barrier 02-100, which is less flexible and stiffer than elastomeric gloves such as the CR/EVA/Nylon glove.

EXAMPLE 3

Nitrile/Neoprene Blend Glove

The Example 2 formulation as used, except with 80% solids of the polymer being nitrile, and 20% being chloroprene. The EVA and Nylon were as in Example 1. Dipping and curing was pursuant to Example 2. The testing according to EN 16523-1:2015 was as follows:

| Breakthrough time (minutes) against below Chemicals | Sample 1 | Sample 2 | Sample 3 |
|---|---|---|---|
| Acetone | > 480 (median thickness: 0.316 mm) | > 480 (median thickness: 0.303 mm) | > 480 (median thickness: 0.304 mm) |
| Tetrahydrofuran | > 480 (median thickness: 0.301 mm) | 5 (median thickness: 0.291 mm) | > 480 (median thickness: 0.308 mm) |

The above results again show that the non-reactive tie adhesion of EVA polymer in between the first layer of elastomeric coating or its blends and the third layer of polyamide nylon terpolymer solution is effective in providing strong bonding (believed to be via hydrogen bonds) for good barrier properties against polar solvents and esters. The one low THF result is believed to be a result of a coating process flaw.

EXAMPLE 4

Nitrile-Polyester/Neoprene Blend, Supported Glove

Gloves were made with the addition of Neoprene to Polyester in 8:2 ratio for the first coated elastomeric polymeric barrier sublayer. A second sublayer of Neoprene (sans polyester) was added. The glove had layer 10A at ~8 mil, layer 10B at ~9 mil, layer 12 at ~2 mil and layer 14 at ~1 mil. The stripped glove was then bonded with thermoplastic PU (hot melt) to a knitted liner. The gloves were tested by the EN374-4:2013 Degradation test (swelling) for a period of 1 hour +5 minutes with the following results relative to some comparative gloves:

| Chemical<br>1: non-polar<br>2: polar aprotic<br>3: polar protic | Current<br>Suitable<br>Glove | Ex. 4 | APT<br>58-535 | 14 mil<br>US<br>Guardian<br>Butyl | Neoprene<br>Ansell<br>29-865 | Nitrile<br>Ansell<br>37-176 |
|---|---|---|---|---|---|---|
| Toluene-1 | Barrier | 23 | 43 | 67 | NA | 83 |
| THF-2 | Barrier | 33 | NA | NA | NA | NA |
| Ethyl Acetate-2 | Barrier | 11 | 35 | 25 | 87 | 89 |
| Acetone-2 | Barrier/Butyl | 17 | 42 | 3 | NA | 90 |
| Methanol-3 | Barrier/Butyl/Butyl Viton | 15 | 20 | −5 | NA | 56 |
| Sulfuric acid | Barrier/Butyl/BV | 9 | NA | 32 | 59 | 62 |

The results show excellent resistance to chemical degradation for the Example 4 gloves.

NUMBERED EMBODIMENTS

The invention is described further with respect to the following numbered embodiments.

Embodiment 1A. An elastomeric article providing a chemical barrier, the article having a layered structure comprising a sequential laminate of: (a) a latex-based elastomeric polymeric barrier layer; (b) a layer of non-reactive tie adhesive resin layer comprising oxo (—(C═O)—) groups; and (c) a polyamide layer comprising polyamide polymer; wherein the layered structure has a first side nearest the latex-based elastomeric polymeric barrier layer and a second side; wherein the layered structure is effective to provide a chemical permeation time in excess of 100 minutes pursuant to EN 16523-1:2015 for benchmark solvents of acetone, ethyl acetate and methanol, when applied to the first side, and in excess of 100 minutes for acetone when applied to the second side; and wherein the elastomeric layer is primarily not polyolefin, optionally wherein the elastomeric layer is substantially not polyolefin, optionally wherein the elastomeric layer is materially not polyolefin, optionally wherein the elastomeric layer is essentially not polyolefin.

Embodiment 1B. An elastomeric article providing a chemical barrier, the article having a layered structure comprising a sequential laminate of: (a) a latex-based elastomeric polymeric barrier layer; (b) a layer of non-reactive tie adhesive resin comprising oxo (—(C═O)—) groups; and (c) a polyamide layer comprising polyamide polymer; wherein the layered structure has a first side nearest the latex-based elastomeric polymeric barrier layer and a second side; wherein, for permeation time measured pursuant to EN 16523-1:2015 and compared to a comparative layer of material of the latex-based elastomeric polymeric barrier layer of a thickness of the laminate, the laminate is effective to provide an acetone chemical permeation time superior to that for the comparative layer, whether the acetone is applied on the first side or the second side, and an ethyl acetate and a methanol permeation time superior to those for the comparative layer when applied to the first side, wherein for one such measurement the permeation time is about five-times or more superior to the comparative layer; and wherein the elastomeric layer is primarily not polyolefin.

Embodiment 2. The elastomeric article of one of the numbered elastomeric article embodiments or combination thereof, wherein latex-based elastomeric polymeric barrier layer comprises primarily NBR or chloroprene among polymer components by weight.

Embodiment 3. The elastomeric article of embodiment 2, wherein the primary polymer is blended with a more hydrophobic polymer Embodiment 4. The elastomeric article of one of the numbered elastomeric article embodiments or combination thereof, wherein polymers of the latex-based elastomeric polymeric barrier layer are blended with a water dispersible saturated polyester resin, ultrafine high molecular weight polyamide powder, ethylene based copolymer, or a hydrophobic wax, or a mixture thereof.

Embodiment 5. The elastomeric article of one of the numbered elastomeric article embodiments or combination thereof, wherein is latex-based elastomeric polymeric barrier layer is from about 5 mils to about 20 mils in thickness.

Embodiment 6. The elastomeric article of one of the numbered elastomeric article embodiments or combination thereof, wherein the non-reactive tie adhesive resin layer is from about 0.3 mil to about 10 mils in thickness.

Embodiment 7. The elastomeric article of one of the numbered elastomeric article embodiments or combination thereof, wherein the polyamide layer is from about 0.1 mils to about 5 mils in thickness.

Embodiment 8. The elastomeric article of one of the numbered elastomeric article embodiments or combination thereof, wherein the non-reactive tie adhesive resin layer is comprised primarily with respect to polymers of EVA, EMA, EAA, ethylene vinyl polyester, ethylene grafted maleic anhydride or AMP, or mixtures thereof Embodiment 9. The elastomeric article of one of the numbered elastomeric article embodiments or combination thereof, wherein the polyamide resin of the polyamide layer has a melting point from about 100° C. to about 200° C.

Embodiment 10. The elastomeric article of one of the numbered elastomeric article embodiments or combination thereof, wherein the polyamide polymer comprises one or more polymers formed from monomers from the group consisting of caprolactam, adipic acid, azelaic acid, sebacic acid, 1,10-decanedicarboxylic acid and hexamethylene diamine.

Embodiment 11. The elastomeric article of one of the numbered elastomeric article embodiments or combination thereof, wherein the polyamide polymer comprises one or more polymers that are nylon 6, nylon 66 or nylon 69.

Embodiment 12. The elastomeric article of one of the numbered elastomeric article embodiments or combination thereof1, wherein the nylon polymers are nylon 6, nylon 66 and nylon 69 in the respective amounts by weight and with respect to polymers of about 35 to about 55%, about 5 to about 35% and about 20 to about 55%.

Embodiment 13. The elastomeric article of one of the numbered elastomeric article embodiments or combination thereof, wherein the polyamide polymer comprises one or more polymers that are nylon 6, nylon 66 or nylon 610.

Embodiment 14. The elastomeric article of one of the numbered elastomeric article embodiments or combination thereof3, wherein the nylon polymers are nylon 6, nylon 66 and nylon 610 in the respective amounts by weight and with respect to polymers of about 30 to about 75%, about 10 to about 80% and about 10 to about 80%.

Embodiment 15. The elastomeric article of one of the numbered elastomeric article embodiments or combination thereof, wherein the polyamide polymer comprises one or more polymers that are nylon 6, nylon 66 or nylon 612.

Embodiment 16. The elastomeric article of one of the numbered elastomeric article embodiments or combination thereof5, wherein the nylon polymers are nylon 6, nylon 66 and nylon 612 in the respective amounts by weight and with respect to polymers of about 30 to about 75%, about 10 to about 80%, and about 10 to about 80%.

Embodiment 17. The elastomeric article of one of the numbered elastomeric article embodiments or combination thereof, wherein polymers of the latex-based elastomeric polymeric barrier layer comprise primarily by weigh butyl, NBR or chloroprene, or blends thereof, and further comprise vinyl polymers comprising oxo groups.

Embodiment 18. The elastomeric article of one of the numbered elastomeric article embodiments or combination thereof, wherein the latex-based elastomeric polymeric barrier layer comprises NBR and a water dispersible polyester resin, and wherein the non-reactive tie adhesive resin layer comprises EVA copolymer.

Embodiment 19. The elastomeric article of one of the numbered elastomeric article embodiments or combination thereof, wherein the ratio of NBR to polyester resin is from about 9:1 to about 4:1 by weight.

Embodiment 20. The elastomeric article of one of the numbered elastomeric article embodiments or combination thereof, wherein the latex-based elastomeric polymeric barrier layer comprises NBR and hydrophobic wax, and wherein the non-reactive tie adhesive resin layer comprises EVA copolymer.

Embodiment 21. The elastomeric article of claim 20, wherein the wax is in an amount from about 1 to about 5 parts per hundred elastomeric polymer.

Embodiment 22. The elastomeric article of one of the numbered elastomeric article embodiments or combination thereof, wherein the latex-based elastomeric polymeric barrier layer comprises chloroprene and hydrophobic wax, and wherein the non-reactive tie adhesive resin layer comprises EVA copolymer.

Embodiment 23. The elastomeric article of claim 22, wherein the wax is in an amount from about 1 to about 5 parts per hundred elastomeric polymer.

Embodiment 24. The elastomeric article of one of the numbered elastomeric article embodiments or combination thereof, wherein the benchmark solvents show a chemical permeation time in excess of 200 minutes.

Embodiment 25. The elastomeric article of one of the numbered elastomeric article embodiments or combination thereof, wherein the benchmark solvents show a chemical permeation time in excess of 400 minutes.

Embodiment 26. The elastomeric article of one of the numbered elastomeric article embodiments or combination thereof, wherein the benchmark solvents show a chemical permeation time in excess of 480 minutes.

Embodiment 27. The elastomeric article of one of the numbered elastomeric article embodiments or combination thereof, wherein the benchmark solvents include MEK.

Embodiment 28. The elastomeric article of one of the numbered elastomeric article embodiments or combination thereof, wherein the article is a glove.

Embodiment M1. A method of forming an elastomeric article providing a chemical barrier of one of the numbered elastomeric article embodiments or combination thereof, comprising: forming the latex-based elastomeric polymeric barrier layer; forming the layer of non-reactive tie adhesive resin comprising oxo (—(C=O)—) groups on a surface of the latex-based elastomeric polymeric barrier layer; and forming the polyamide layer on the tie adhesive layer.

Embodiment M2. The method of a method embodiment, wherein the laminate is cured after the third forming step;

Embodiment M3. The method of a method embodiment, wherein a laminate of the product of the first two forming steps is cured, prior to the third forming step.

Embodiment M4. The method of a method embodiment, wherein a laminate of the latex-based elastomeric polymeric barrier layer is cured, prior to the second forming step.

Embodiment M5. A method of using an elastomeric article providing a chemical barrier of one of the numbered elastomeric article embodiments or combination thereof, comprising: dressing a part of a human body at risk of chemical exposure with the article; and wearing the article for a period of time during which there is a risk of such exposure.

Further Misc

This invention described herein is of a elastomeric articles providing a chemical barrier and methods of forming and using the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that sub-feature Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. An elastomeric glove providing a chemical barrier, the glove having a layered structure comprising:
   (a) an aqueous latex-based elastomeric polymeric barrier layer formed by dipping a former into a colloidally stable blend comprising greater than about 50% by weight of a rubber lattice blended in an aqueous elastomeric latex, the rubber lattice comprising natural rubber, chloroprene rubber, butyl rubber, acrylonitrile butadiene rubber, styrene-butadiene rubber, polyurethane, or a combination thereof;
   (b) a non-reactive tie adhesive resin layer comprising oxo (—(C=O)—) groups, disposed by dipping on the aqueous latex-based elastomeric polymeric barrier layer comprising a carbon atom doubled bonded to an oxygen atom; and
   (c) a polyamide layer disposed on the non-reactive tie adhesive resin layer by dipping comprising polyamide polymer;
   wherein one or more of the layers are dried and cured after said dipping;
   wherein the layered structure has a first side nearest the aqueous latex-based elastomeric polymeric barrier layer and a second side;
   wherein the layered structure is effective to provide a chemical permeation time in excess of 100 minutes pursuant to EN 16523-1:2015 for benchmark solvents of acetone, ethyl acetate and methanol, when applied to the first side, and in excess of 100 minutes for acetone when applied to the second side;
   wherein the aqueous latex-based elastomeric polymeric barrier layer is less than 50% by weight polyolefin.

2. The elastomeric glove of claim 1, wherein polymers of the aqueous latex-based elastomeric polymeric barrier layer comprise greater than 50% by weight butyl, NBR, chloroprene, or blends thereof, and further comprises vinyl polymers comprising oxo (—(C=O)—) groups, each comprising a carbon atom doubled bonded to an oxygen atom.

3. The elastomeric glove of claim 2, wherein the aqueous latex-based elastomeric polymeric barrier layer is essentially free of polyolefin.

4. The elastomeric glove of claim 1, wherein polymers of the aqueous latex-based elastomeric polymeric barrier layer are blended with a water dispersible saturated polyester resin, ultrafine high molecular weight polyamide powder, ethylene based copolymer, a hydrophobic wax, or a mixture thereof.

5. The elastomeric glove of claim 1, wherein the aqueous latex-based elastomeric polymeric barrier layer is from about 5 mils to about 20 mils in thickness, wherein the non-reactive tie adhesive resin layer is from about 0.3 mil to about 10 mils in thickness, and wherein the polyamide layer is from about 0.1 mils to about 5 mils in thickness.

6. The elastomeric glove of claim 1, wherein the non-reactive tie adhesive resin layer comprises greater than or equal to about 50% by weight of EVA, EMA, EAA, ethylene vinyl polyester, ethylene grafted maleic anhydride or AMP, or mixtures thereof.

7. The elastomeric glove of claim 6, wherein the aqueous latex-based elastomeric polymeric barrier layer comprises NBR and a water dispersible polyester resin.

8. The elastomeric glove of claim 1, wherein the polyamide polymer comprises nylon 6, nylon 66, nylon 69, nylon 610, nylon 612, or a combination thereof.

9. The elastomeric glove of claim 1, wherein the polyamide polymer comprises:
   about 30 to about 75% by weight nylon 6;
   about 5 to about 80% by weight nylon 66;
   about 20 to about 55% by weight nylon 69;
   about 10 to about 80% by weight nylon 610; or
   about 10 to about 80% by weight nylon 612.

10. The elastomeric glove of claim 1, wherein the polyamide polymer comprises:
    i) a terpolymer comprising nylon 6, nylon 66, and nylon 69, wherein:
       the nylon 6 is present at about 35 to about 55% by weight;
       the nylon 66 is present at about 5 to about 35% by weight; and
       the nylon 69 is present at about 20 to about 55% by weight in the terpolymer;
    ii) a terpolymer comprising nylon 6, nylon 66, and nylon 610, wherein:
       the nylon 6 is present at about 35 to about 75% by weight;
       the nylon 66 is present at about 10 to about 80% by weight; and
       the nylon 610 is present at about 10 to about 80% by weight in the terpolymer; or
    iii) a terpolymer comprising nylon 6, nylon 66, and nylon 612, wherein:
       the nylon 6 is present at about 30 to about 75% by weight;
       the nylon 66 is present at about 10 to about 80% by weight; and
       the nylon 612 is present at about 10 to about 80% by weight in the terpolymer.

11. The elastomeric glove of claim 1, wherein the aqueous latex-based elastomeric polymeric barrier layer comprises chloroprene and hydrophobic wax, and wherein the non-reactive tie adhesive resin layer comprises EVA copolymer.

12. The elastomeric glove of claim 1, wherein the benchmark solvents show a chemical permeation time in excess of 200 minutes.

13. The elastomeric glove of claim 1, wherein the benchmark solvents include MEK.

14. The elastomeric glove of claim 1, wherein the elastomeric layer is substantially not polyolefin in that less than 30% weight of polymer is polyolefin.

15. The elastomeric glove of claim 1, wherein the elastomeric layer is materially not polyolefin in that less than 20% weight of polymer is polyolefin.

16. The elastomeric glove of claim 1, wherein a polyamide polymer of the polyamide layer has a melting point from about 100° C. to about 200° C.

17. The elastomeric glove of claim 1, wherein the polyamide polymer comprises one or more polymers formed from monomers selected from the group consisting of caprolactam, adipic acid, azelaic acid, sebacic acid, 1,10-decanedicarboxylic acid and hexamethylene diamine.

18. A method of forming the elastomeric article glove providing a chemical barrier of claim 1, comprising:
    forming the aqueous latex-based elastomeric polymeric barrier layer by dipping a former into the colloidally stable blend comprising greater than about 50% by weight of a rubber lattice blended in an aqueous elastomeric latex, the rubber lattice comprising natural rubber, chloroprene rubber, butyl rubber, acrylonitrile butadiene rubber, styrene-butadiene rubber, polyurethane, or a combination thereof;
    dipping the former having the aqueous latex-based elastomeric polymeric barrier layer into the non-reactive tie adhesive resin comprising a carbon atom doubled bonded to an oxygen atom oxo (—(C=O)—) groups on a surface of the aqueous latex-based elastomeric polymeric barrier layer to form the non-reactive tie adhesive resin layer; and dipping the former having the non-reactive tie adhesive resin layer into a dispersion comprising the polyamide polymer forming the polyamide layer on the non-reactive tie adhesive resin layer.

19. A method of using the elastomeric glove providing a chemical barrier of claim 1, comprising: donning a human hand at risk of chemical exposure with the glove; and wearing the glove for a period of time during which there is a risk of such exposure.

20. The elastomeric glove of claim 1, wherein the aqueous latex-based elastomeric polymeric barrier layer provides greater than about 50% of a thickness of the glove.

21. An elastomeric glove providing a chemical barrier, the glove having a layered structure comprising:
   (a) an aqueous latex-based elastomeric polymeric barrier layer formed by dipping a former into a colloidally stable blend comprising greater than about 50% by weight of a rubber lattice blended in an aqueous elastomeric latex, the rubber lattice comprising natural rubber, chloroprene rubber, butyl rubber, acrylonitrile butadiene rubber, styrene-butadiene rubber, polyurethane, or a combination thereof;
   (b) a non-reactive tie adhesive resin layer comprising oxo (—(C=O)—) groups, disposed by dipping on the aqueous latex-based elastomeric polymeric barrier layer each comprising a carbon atom doubled bonded to an oxygen atom; and
   (c) a polyamide layer disposed on the non-reactive tie adhesive resin layer by dipping, comprising polyamide polymer;

wherein one or more of the layers are dried and cured after said dipping;

wherein the layered structure has a first side nearest the aqueous latex-based elastomeric polymeric barrier layer and a second side;

wherein, for permeation time measured pursuant to EN 16523-1:2015 and compared to a comparative layer of material of the aqueous latex-based elastomeric polymeric barrier layer of a thickness of the layered structure, the layered structure is effective to provide an acetone chemical permeation time superior to that for the comparative layer, whether the acetone is applied on the first side or the second side, and an ethyl acetate and a methanol permeation time superior to those for the comparative layer when applied to the first side, wherein for one such measurement the permeation time is about five-times or more superior to the comparative layer, and wherein the aqueous latex-based elastomeric polymeric barrier layer is less than 50% by weight polyolefin, and wherein the aqueous latex-based elastomeric polymeric barrier layer provides greater than about 50% of a thickness of the glove.

* * * * *

UNITED STATES PATENT AND TRADEMARK OFFICE
CERTIFICATE OF CORRECTION

PATENT NO. : 12,036,774 B2
APPLICATION NO. : 17/603169
DATED : July 16, 2024
INVENTOR(S) : Noorman Abu Hassan Page 1 of 1

It is certified that error appears in the above-identified patent and that said Letters Patent is hereby corrected as shown below:

In the Specification

Column 7, Line 45, please delete "laver" and substitute "layer"

In the Claims

In Claim 18, Column 20, Line 54, please delete "article"

In Claim 21, Column 21, Line 28, please delete "each"

In Claim 21, Column 22, Line 22, please delete "and"

Signed and Sealed this
Fifteenth Day of October, 2024

Katherine Kelly Vidal
*Director of the United States Patent and Trademark Office*